May 7, 1968     C. W. FYE ETAL     3,381,711
POWER SUPPLY FOR PORTABLE POWER TOOLS
Filed April 29, 1965
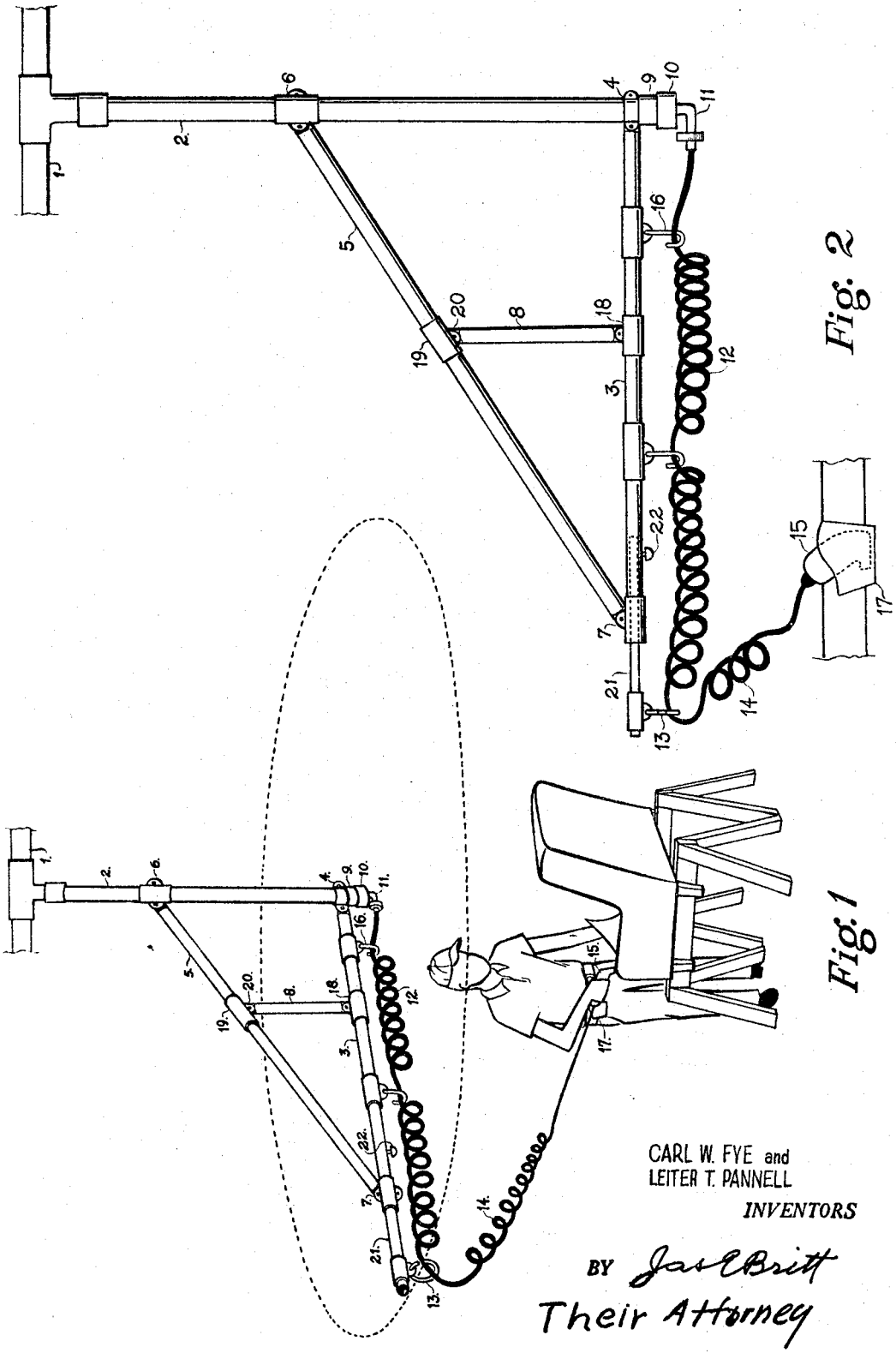
CARL W. FYE and
LEITER T. PANNELL
*INVENTORS*
BY *Jack E Britt*
*Their Attorney*

3,381,711
POWER SUPPLY FOR PORTABLE POWER TOOLS
Carl W. Fye, P.O. Box 261, Newton, N.C. 28658, and
Leiter T. Pannell, P.O. Box 493, Claremont, N.C.
28610
Filed Apr. 29, 1965, Ser. No. 451,902
10 Claims. (Cl. 137—615)

ABSTRACT OF THE DISCLOSURE

Power is supplied to a pneumatic power tool through a hose running along an arm, revolvable any number of times, to a turn-down point which would circumscribe a work area as it might be moved along a path about its periphery, from which the hose revolvable with the arm must swing inwardly to reach the power tool, thereby minimizing the interference of the hose with the operator of the tool. The arm and the hose are separate entities as far as their functions are concerned.

---

This invention relates to a method of conveying pneumatic power to a portable power tool from an overhead power supply line. It is more particularly related to a system for conveying power out from a branch of the pneumatic power supply line, located at the work area, to a light weight tool to be plied in the area without interference due to overhead dangling of a portion of the line.

In the prior art power was supplied from an overhead line with branches installed in each work area. Usually the branch consisted of a depending pipe or conduit directly to the lower end of which was attached a flexible line or conductor reaching down to the power tool. As the workman plied his tool this flexible line would, in most operator positions, be dangling against his body, shoulders and arms creating an interference with the most dexterous use of his tool.

It is the primary object of our invention to eliminate the dangling interference of the flexible portion of the power line or conductor even when supported from overhead with the use of a portable power tool within its work area.

Another object of this invention is to provide for an individual tool power supply line branch or conductor extension to reach down from a movable branch line support rotatable around the circumference of a work area to connect with the power tool plied within the area with the minimum of interference by the line with the most dexterous use of the tool.

Another object is to provide a rotatable arm extending radially from a point within the work area and a power conductor, likewise rotatable, extending along with the arm and depending from a support point along the arm to connect with the power tool.

Another object of this invention is to provide an extension of the power line branch arranged to be carried by and revolve with an outwardly extending revolvable arm and extend out toward the end of the arm to a point from where it depends down in an inward direction and connects with a power tool.

Another object is to reduce the function of the outwardly reaching portion of a rotatable power conductor extension to that of conducting power only and that of a power coupling associated therewith to that of coupling power only by suitably supporting the extension and the coupling by a likewise rotatable load carrying arm independent in its function from the conductor and the coupling.

Another object is to provide suitable connections between a power line branch and both an arm and a conductor associated therewith with free rotatability, so that together they may revolve to assume radial alignment with any position which the power tool may take as it is plied in the work area.

Another object is to provide a rotatable arm for supporting a branch line extension with a suitable length to reach down to a power tool through a line support at an outward point along the arm which will completely circumscribe an area generally equal to or larger than the work area so that the extension supported along the arm and turning down at this point will always be reaching inwardly from the support point to the tool.

Another object is to provide a radial arm having means for adjusting the distance out to the turn-down point may be varied according to the size of the work area to be circumscribed, thereby maintaining the inward reach of the outer branch of the extension line to the tool.

Another object is to provide a system for keeping a hand operated pneumatic tool in a position readily available to an operator even though he is continually changing position within a predetermined work area.

Still another object is to embody these objects in a system using pneumatic power such as compressed air.

A still further object is to provide a quickly and easily assembled system for accomplishing the purposes of the invention.

These and other objects will be apparent from the description of one embodiment of the invention illustrated in the accompanying drawing in which:

FIG. 1 shows the disposition of the power line extension supported by an arm arranged so that its outer end circumscribes the work area.

FIG. 2 shows more clearly the details of a typical method of constructing and mounting the arm.

It is evident that the use of this invention is not limited to any one type of work process. It may be applied with equal facility to any situation in which it would be advantageous to use a portable type of power tool supplied with power from a distribution system. However, in order to more clearly describe the invention it will be explained as applied to a furniture assembly situation using compressed air as power. In FIG. 1 a compressed air distribution header or main line 1 is installed to pass over substantially the center of the work area here illustrated and may extend over any number of other work areas in the plant. Where the main line crosses the area, a branch in the form of a depending stem 2 extends down a suitable distance and is made secure in a vertical position. Near the lower end of the stem a radially extending arm 3 is arranged to extend outwardly from a main yoke 4 fitted to rotate freely around the stem. To firmly support the arm, an upper bracing member 5 extends downwardly from a similarly fitted secondary yoke 6 spaced above yoke 4 and is suitably joined at point 7 with a connector to arm 3. Yokes 4 and 6 may be spread apart by strut 8 set between members 3 and 5. Thus is formed a triangular truss member. This may be prefabricated as a unit and comprise the basic part of what might be, in a pneumatic system, termed a hose carrier.

When the hose carrying truss is mounted in operating position on stem 2, the weight is preferably carried by lower yoke 4 arranged to rest on collar 9 mounted at the lower end of stem 2. Collar 9 cooperating with yoke 4 may be so formed as to constitute a thrust bearing to support the weight of the hose carrier and the parts associated therewith. Power as compressed air is conveyed down vertical stem 2 and through collar 9 to an air coupling female member 10. A swivel member 11 constitutes the mating member of a complete air coupling of the quick coupler type readily available to the trade. When member 11 is inserted into 10 a leakproof joint is formed, even though member 11 may be rotated about, and will remain so for the normal life of such a coupling if the function of the parts thereof is limited to coupling only.

To member 11 is joined an air conducting hose section 12 extending along arm 3. Toward the outer end of the arm supporting means 13 is provided from which an extension section 14 extends down from the arm and connects with a pneumatic power tool 15. Section 14 may be separate or a continuation of section 12. As section 12 extends along arm 3, it may be held up by hooks 16 or otherwise supported along the arm. Enough support should be provided to the hose sections to eliminate any interference with the normal rotatability and sealing function of coupling 10 and connector 11 which could occur if an undesirable side thrust or pull is exerted against it.

At least section 14 is required to embody elasticity. With compressed air as power, the preferred form is the well known coiled plastic tubing with spring-like action widely used as a coupling hose between a pneumatic tool and a compressed air line. Such a hose will maintain a desired tension, the function of which will more fully appear in the explanation to follow.

Referring now to FIG. 2, some further details of the embodiment of the invention as shown will be described. For best operation the branch 2 depending from main line 1 should be aligned and held vertically in a rigid position and for most locations at or over the work area. The lower yoke 4 may be made as a closable yoke arranged to open and enclose branch member 2 and seat on collar 9 to form a bearing to carry the weight of the triangular truss already described. Yoke 4 may take the form of a split sleeve as shown in FIG. 2. Other forms will be obvious to those skilled in the art. On the other hand the upper yoke may or may not be formed as a closed type. It could in effect be an open hook having a bearing surface on the outer side and an opening on the inside to receive the depending branch 2.

As has been described the power conductor branch 2 for most installations is located substantially in the center of the work area. Arm 3 as described is chosen of a length such that the conductor support 13 would, as the arm revolves, with ample margin circumscribe the work area. With section 14 having an elastic capability, and communicating between support 13 at the outer end of arm 3 and the power tool 15, it will always be in tension. The fully revolvable arm 3 will then follow the tool and stand substantially in radial alignment over whatever position the tool may take as it is plied in the work area. When considered as a system according to the description herein the hose carrier may be said to "shadow" the operator as it revolves to assume a position over him as he moves to any new position in the circumscribed work area. Such being the case the power conducting section 14 in communication with the tool 15 will always be reaching in from the periphery of the work area thus eliminating interference which is produced when the power conductor dangles over the head and shoulders of the tool operator.

Referring now to both FIGS. 1 and 2, an important feature of the hose carrier system is means for keeping tool 15 readily at hand at all the usual positions an operator may assume in carrying out his work in the circumscribed work area. When the hose carrier is installed as described herein with hose 14 always reaching inwardly from the periphery of the work area, it will be found that for the right handed operator the hose will generally extend past the operator's right side when being applied to the work and, of course, vice versa for left handed operators.

Between periods of use the tool is kept at hand by attaching a holster 17 to the operator's belt or some other part of the clothing in which to lodge tool 15 so that it will always be at hand without having to reach out for it. The so-called "shadowing" of the hose and hose carrier combination renders the further combining of holster 17 into the system doubly effective as the best and most expeditious arrangement for handling the application of power tools to various operations, resulting in the greatest ease and convenience, increasing output wherever it is used.

If the radial arm assembly, comprised mainly of members 3, 5, and 8 is considered as a whole, it may be regarded as a triangular truss. When it is to be supplied in large numbers for identical installations the members 3, 5, and 8 may be joined with fixed joints. But for installations where the conditions may vary, it may be desirable to make the truss member adjustable by using some means such as adjustable sleeve clamps at 7, 18, and 19. These may be a simple type that uses a single bolt 20 for each sleeve which both clamps the sleeve and fastens the adjoining member to it at the same time.

In many cases it may be desirable to adjust the reach of the support arm 3 and the conductor 12 to vary the size of the work area circumscribed. It is preferred to provide this by adding a telescoping extension 21 at the outer end of arm 3 and employing a spirally formed conductor for section 12 which will accommodate itself to the in or out movement of the arm. The down turn support 13 may then be located on the end of the extension. To vary the coverage of the area the extension is adjusted to the desired length and secured by thumb nut 22.

From the foregoing description, the functions and performance of the hose carrier will be seen. As a work piece is placed or comes within the work area, the operator will assume his work position with his power tool connected through supply hose section 14 to the outwardly extending carrier arm at point 13 and lodged in his holster. The tension exerted by the elastic depending section 14 of the hose will have swung the carrier into radial alignment over the power tool and operator. The hose will then be extending inwardly from the outer end of carrier arm 3. In other words, the power hose will be reaching inwardly from an outward point on the periphery of the work area and coming to the tool at the side of the operator instead of dangling around his head and shoulders from a point overhead. The important feature is that this will obtain for any and all points in the work area. Another very important feature is the durability of having the parts with the functions of support and of power coupling separated and arranged to be completely revolvable freely about a pivotal support without danger of impairment of function, should a plurality of revolutions accumulate in one direction.

In operation, this invention frees the operator to move completely around a work piece in the work area with the support arm and air line following his movements as he applies the tool to the points the form of the piece calls for. The whereabouts of the tool or the air line or its connections will not require any thought or effort on the part of the operator as he proceeds.

It should also be noted that the purposes of this invention have been accomplished with a very minimum conbination of parts.

It is to be understood that the form of the invention is merely illustrative and that, while the invention is shown in but one form as applied to a typical type of operation, it will be apparent to those skilled in the art that it may be embodied in many other forms and modifications without departing from the spirit thereof and it is desired, therefore, that only such limitations shall be placed thereon as are imposed by the prior art or by the appended claims.

What we claim is:

1. A power supply system for supplying power to a portable power tool comprising a power supply line having a branch located over a chosen work area in which the tool is to be plied, an outwardly extending arm associated with said branch freely revolvable over said work area, said arm being formed of such a length that its outer end would substantially circumscribe an area equal to larger than the work area as it revolves, a separate power conductor leading from said branch through a swivel connector and extending with said arm to a support point at its outer end from which it must continue downwardly and inwardly to connect with the power tool.

2. A system according to claim 1 having an arm with means for adjusting the radial distance to the down turn support point to adjust the size of the area circumscribed to insure a downward and inward reach to connect with the power tool.

3. A system according to claim 1, in which the arm is made to have such a length that the circle circumscribed by the support point toward its outer end will be outward from any position the tool may assume as it is plied in the work area.

4. The combination of a portable pneumatic power tool disposed to be plied within a chosen work area and means by which power is conducted to the periphery of the area and from there to the power tool, said means comprising a stationary support, a radially extending arm mounted on pivots provided on the support, said pivots being arranged to permit the arm to revolve freely about the support as it swings over the work area, said power conducting means comprising a hose carried by said arm and extending therealong to a turn-down point, a hose support at this point from which the hose turns down and reaches to the power tool, the length of the arm to the turn-down point being adjustable and set according to the size of the work area so that as the arm revolves over the work area the support at the turn-down point will circumscribe or over circumscribe the work area, whereby the reach of the hose from this point to the power tool will always be inward to the power tool at any point in the work area.

5. A combination according to claim 4 in which the hose reaching the power tool is provided with elasticity to exert only sufficient constant tension between the tool and the outer portion of the arm to swing the arm into radial position over the tool at every point in the work area where it is plied, whereby the hose will always be swinging inward to the tool as it is plied in the work area thereby minimizing the interference of the hose wherever the tool is plied in the work area.

6. In a power supply system for suppyling power to a pneumatic power tool to be plied in a chosen work area, a depending stationary member along which power is supplied, a power line branch terminating at the lower end of the stationary member, a bearing for a support arm disposed about the stationary member on which the support arm is carried to swing over the work area, a power hose coupled to the branch terminal and extending along the support arm and on to the power tool, said hose being connected to the branch terminal through a two part coupling independent of said arm bearing, the two parts being pivotal, one with respect to the other, one part being fixed to the stationary member, the other part moving with the arm as it swings, whereby the bearing carries load only while the coupling carries power only, a coupling seal which maintains its sealing action as the coupling parts are pivoted.

7. In a system involving a fabricating process in a specified work area, a pneumatic tool to be plied freely within the work area, an air supply system including a depending branch pipe fixed rigidly in a vertical position over the work area, an air supply hose line coupled to the terminal of said branch pipe through a rotatable coupling and extending to the tool, said hose being comprised of a coiled spring-like tube requiring a very light tension to produce elongation, a hose support arm extending radially from the branch pipe in a single plane and pivotally supported on bearings about the branch constructed to permit the arm to revolve completely and easily over the work area any number of revolutions, means on the arm to carry a section of the air supply line in a horizontal position so that it extends to a support at a turn-down point, the length of the arm to the turn-down point being such that as the support revolves the point will circumscribe the work area, another section of the hose extending downwardly, and due to the peripheral position of the turn-down point support, inwardly to the power tool for most of its points of application, the relation of the slight tension in the hose to the freedom of revolution of the radial arm being such that the arm will be caused to swing radially into position over the tool, virtually shadowing the tool at whatever point it is being plied, and due to the reach of the hose from the turn-down point it will be in a position of least intereference with an operator of the tool, and the coiled hose having at the same time sufficient spring-like retractive action to prevent any slack occurring in it, minimizing the possibility of entanglement therein.

8. A system according to claim 7, in which is included a holster adapted to be attached to the clothing of the operator plying the tool, into which it may be lodged to continue the shadowing action of the arm while the operator is assuming a new position in which he is to apply the tool to the work.

9. In a system for supplying compressed air as power to a pneumatic power tool, a depending branch of a power line comprising stem or pipe fixed in a vertical position, a power tool to be plied within a chosen work area, an extension line arranged to convey power from the branch to the tool, a support for the extension line comprising a radially extending arm pivotally mounted on said branch in association with the extension line, a portion of said line being arranged to extend outwardly along the arm to a support which constitutes a turn-down point from which another portion extends down and connects with the power tool, at least this other portion of the line embodying elasticity, the length of the arm to the turn-down point being such that when it moves around it circumscribes an area equal to or larger than the work area as it pivots about, whereby the downwardly extending portion will be reaching inwardly to connect with the power tool at any position it is plied within the work area, a holster attached to the side of the operator most often toward the periphery of the work area, said holster forming a pocket into which the tool may be lodged, still connected to the hose, while the operator moves about in the work area between periods of application of the tool to the work, thus obviating the necessity for the operator to disconnect the tool or lay it down, sometimes out of reach, while he prepares for the next application of the tool.

10. In a system for supplying compressed air as power, a pneumatic power tool to which power is to be supplied, a depending branch of a power line comprising a stem or pipe fixed in a vertical position, a connecting air hose or line extending between the terminal of the vertical stem and the power tool, a collar secured around the stem, a hose carrier for supporting the air hose comprising a radially extending arm pivotal to revolve freely about the stem, said arm being pivoted on upper and lower yokes about the stem fitted above the collar to revolve freely in either direction any number of times, a thrust bearing embodiment between the lower yoke and the collar to carry both the downward weight of support arm and the hose, a two part coupling disposed to connect the air hose to the stem, a stationary part of which is fixed to the stem below the collar and a rotatable part detachably connected to the stationary part and embodying a portion to which the air hose is attached, enabling the hose to move around with the carrier any number of times, providing a combination in which the hose carrier and the coupling will perform separate and independent functions giving increased durability of the parts, freedom and ease of movement without danger of entanglement.

References Cited

UNITED STATES PATENTS

| | | | |
|---|---|---|---|
| 980,353 | 1/1911 | Smith | 137—580 X |
| 1,264,962 | 5/1918 | Muller | 137—580 X |
| 1,486,120 | 3/1924 | Bayles | 248—17 |
| 2,905,194 | 9/1959 | Smith et al. | 138—1074 X |
| 3,014,494 | 12/1961 | Scott et al. | 137—561 |
| 3,218,010 | 11/1965 | Kapota | 248—51 |

ROBERT K. SCHAEFER, *Primary Examiner.*

J. B. JOIKE, *Assistant Examiner.*